D. M. BERNOTOW.
MACHINE FOR LINING CARTONS.
APPLICATION FILED NOV. 28, 1919.
1,378,581.
Patented May 17, 1921.
10 SHEETS—SHEET 3.
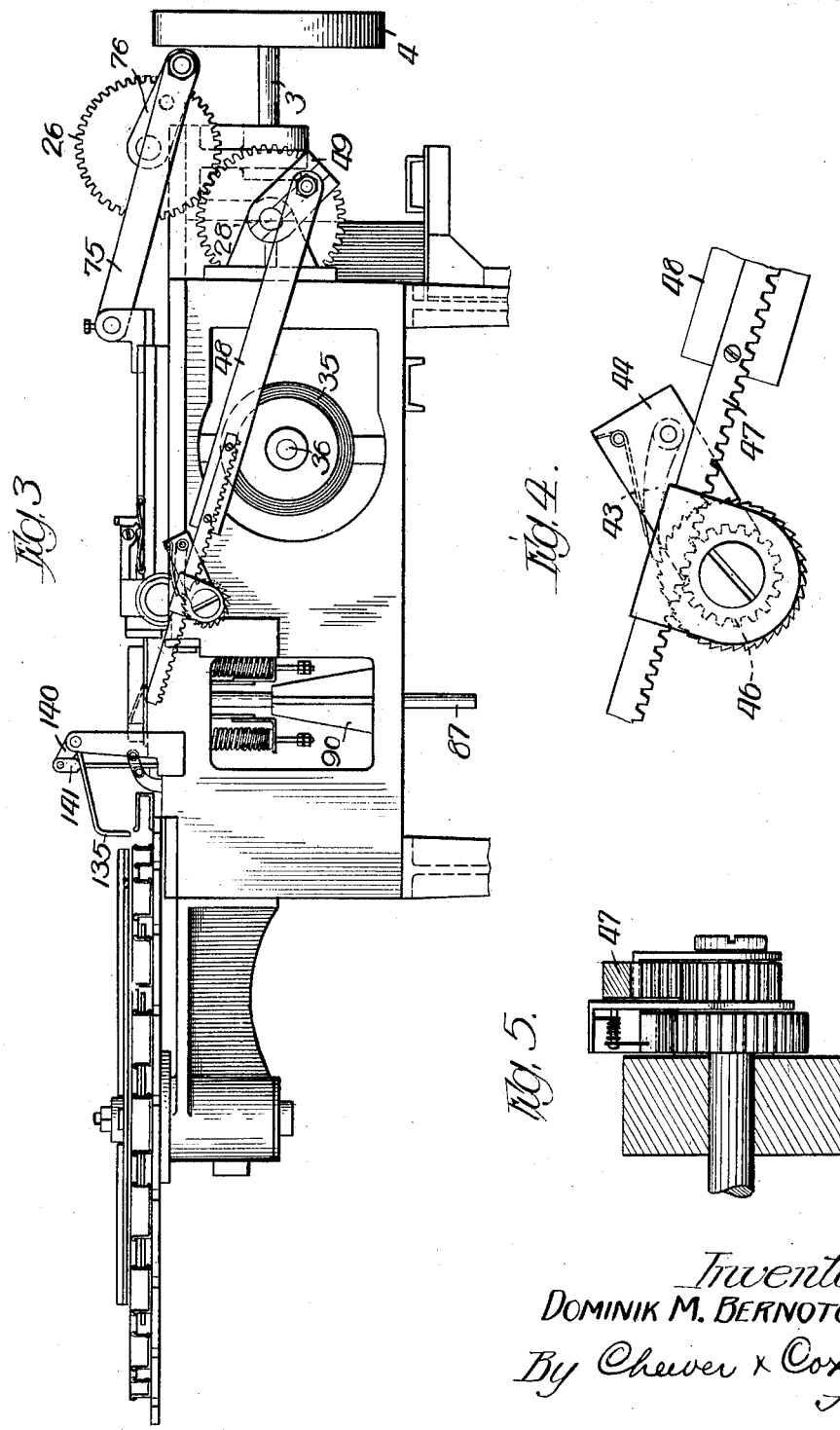
Inventor
DOMINIK M. BERNOTOW
By Cheever & Cox
Atty's

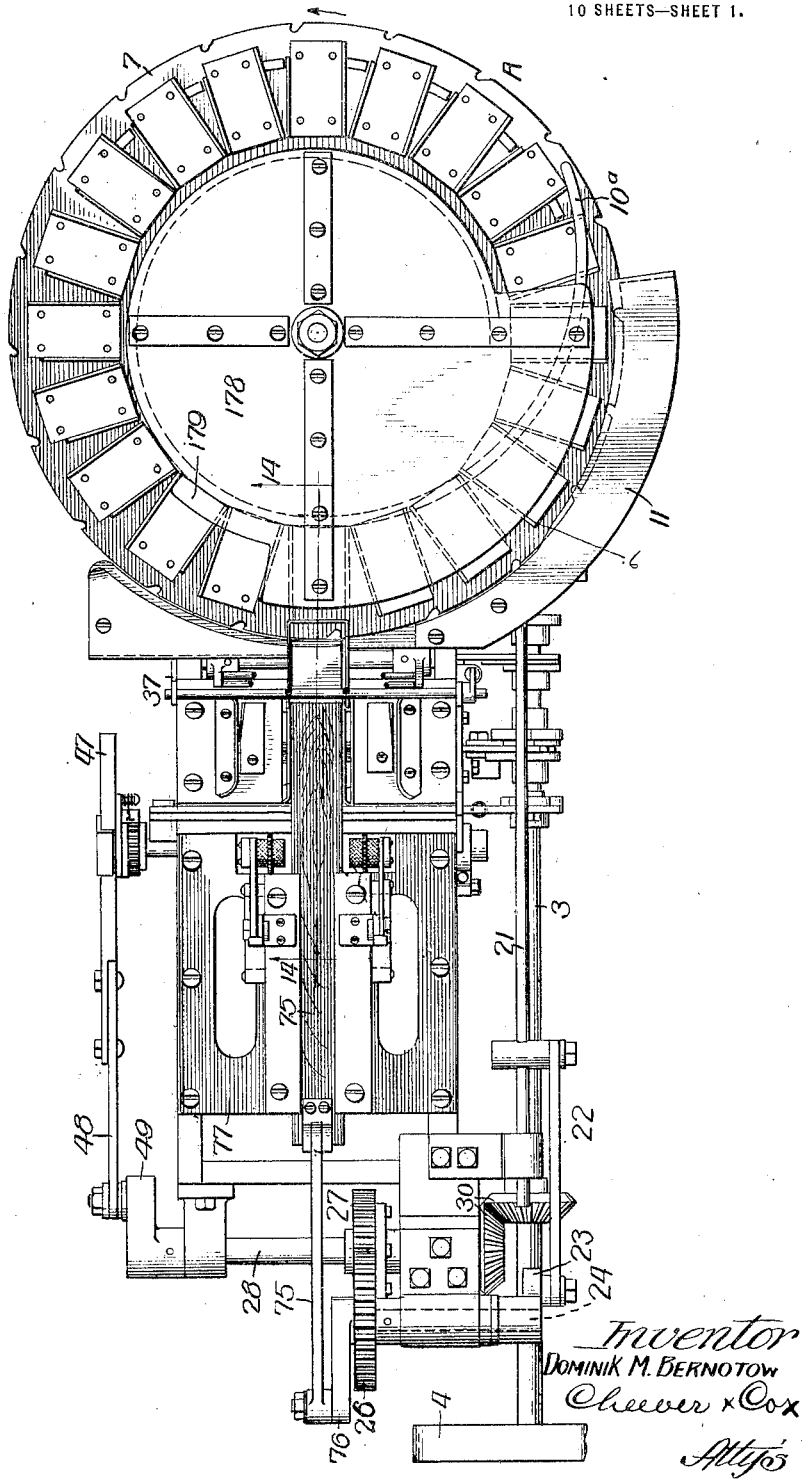

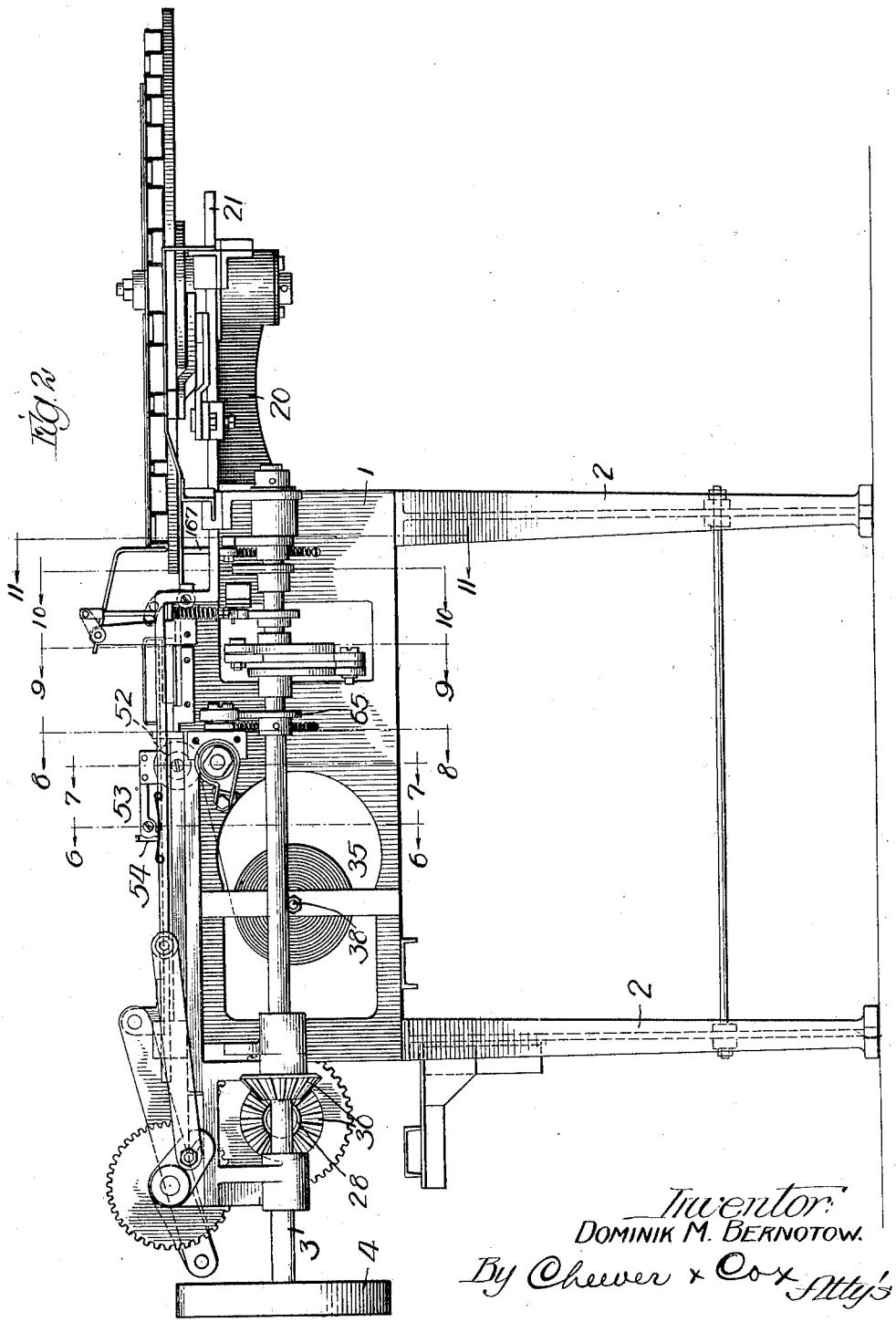

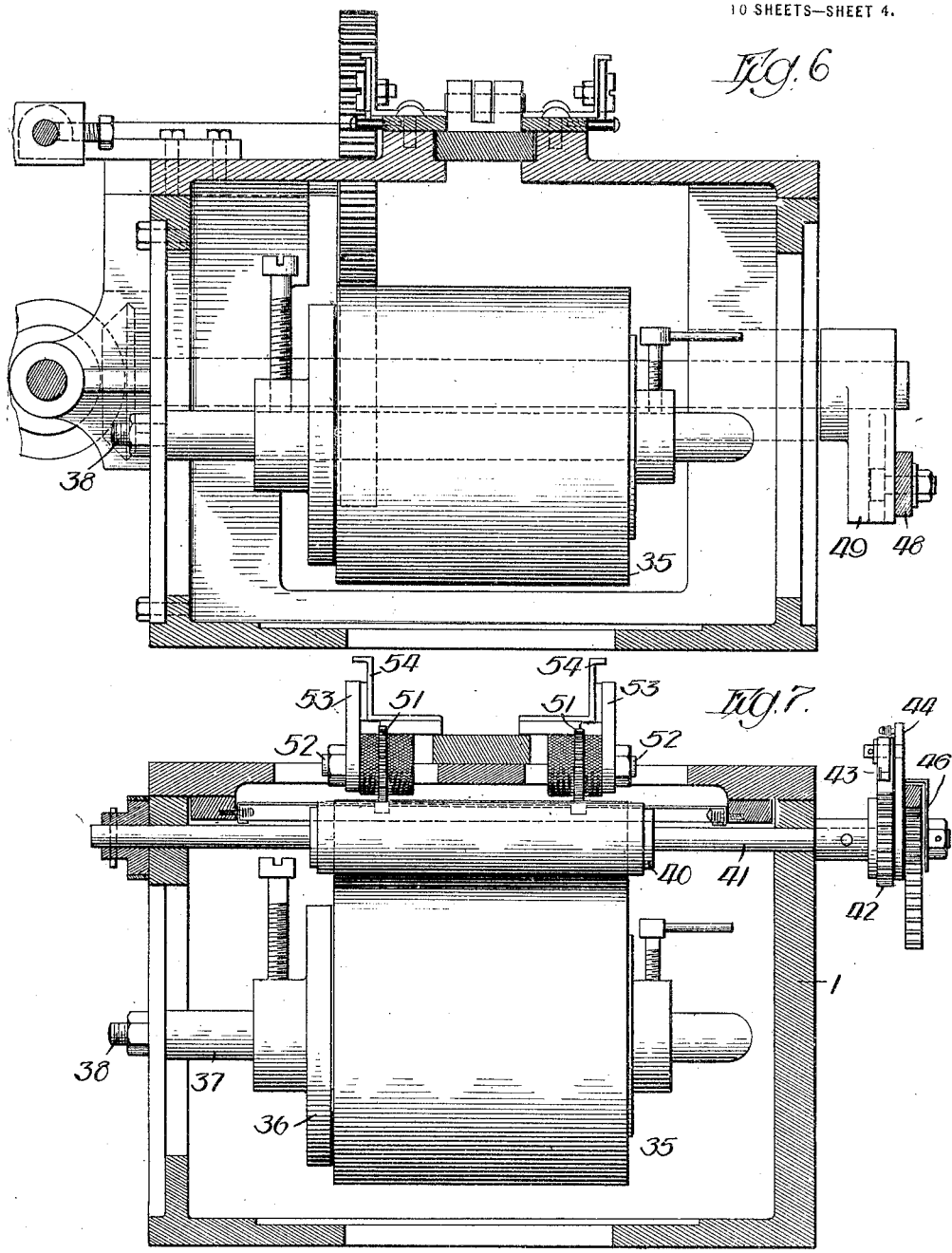

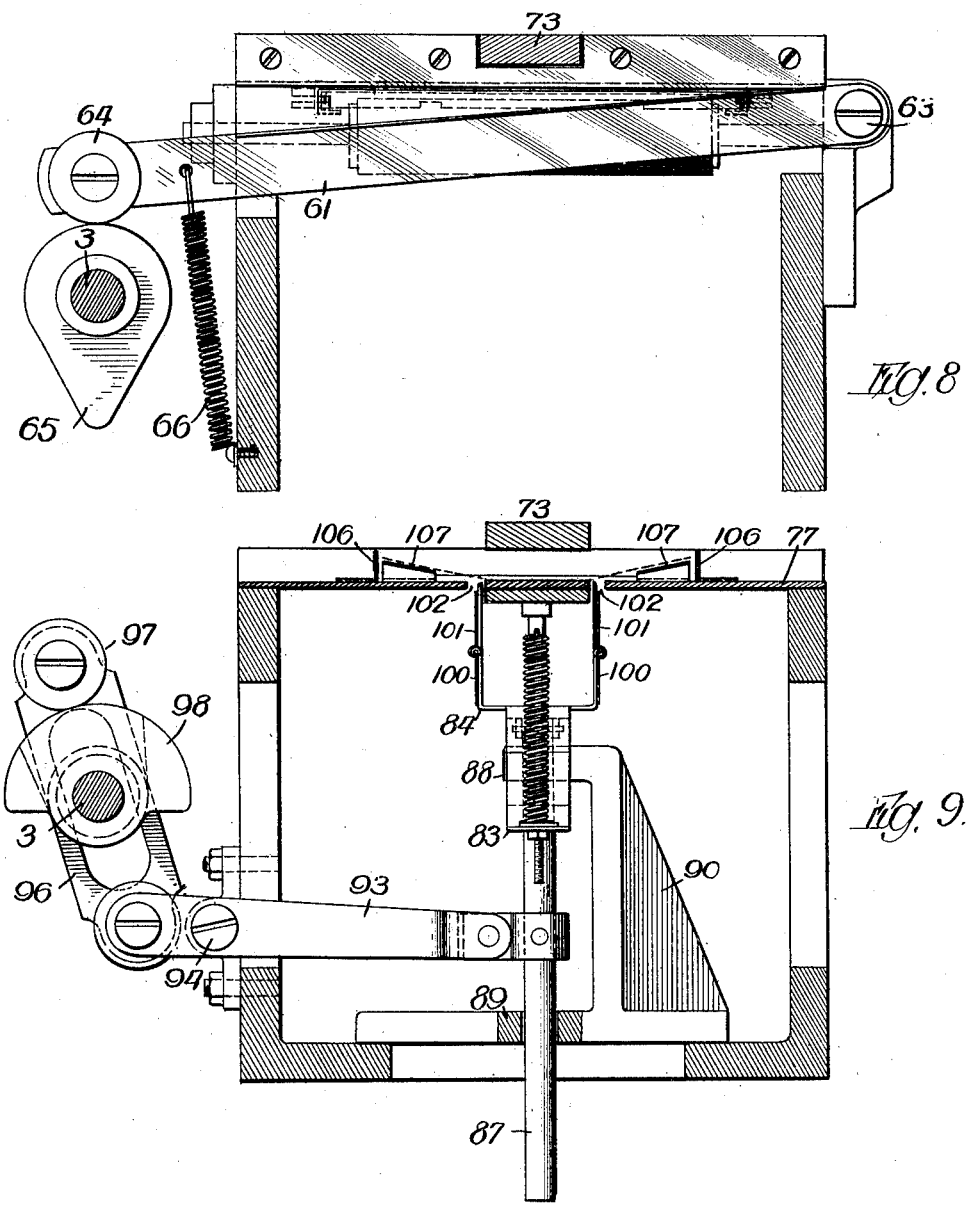

D. M. BERNOTOW.
MACHINE FOR LINING CARTONS.
APPLICATION FILED NOV. 28, 1919.
1,378,581.
Patented May 17, 1921.
10 SHEETS—SHEET 6.
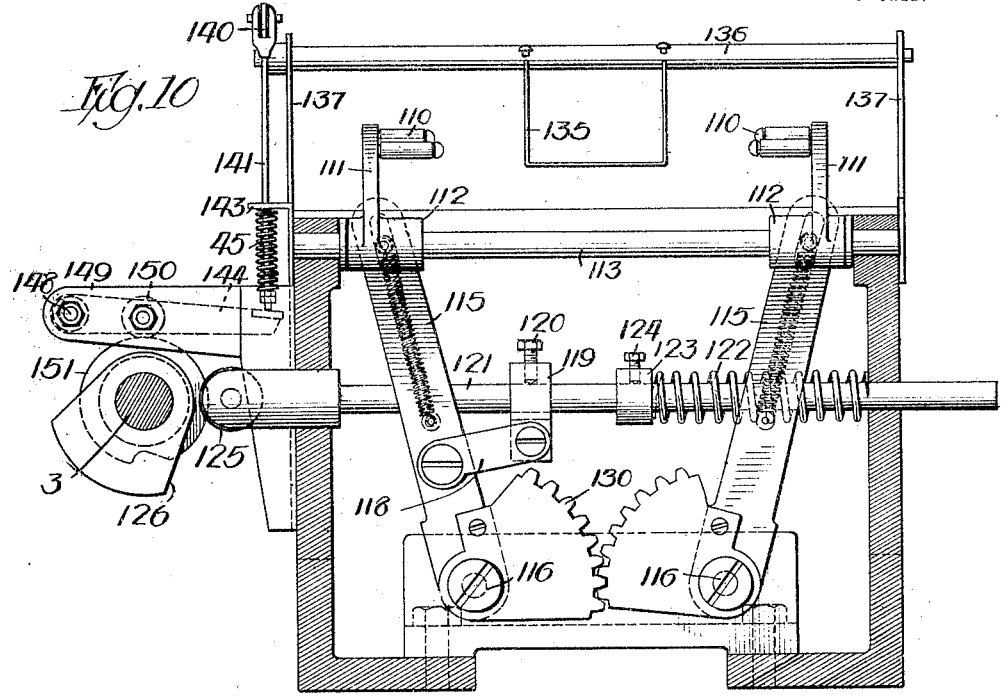
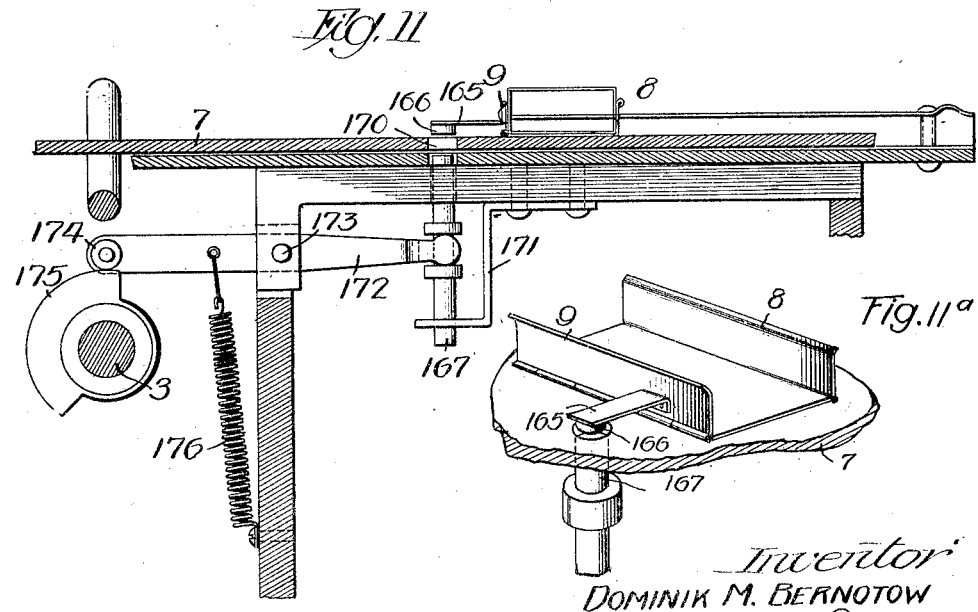
Inventor
DOMINIK M. BERNOTOW
By Cheever & Cox Attys

D. M. BERNOTOW.
MACHINE FOR LINING CARTONS.
APPLICATION FILED NOV. 28, 1919.

1,378,581.

Patented May 17, 1921.
10 SHEETS—SHEET 7.

Inventor
Dominik M. Bernotow
By Cheever & Cox
Atty's

D. M. BERNOTOW.
MACHINE FOR LINING CARTONS.
APPLICATION FILED NOV. 28, 1919.

1,378,581.

Patented May 17, 1921.
10 SHEETS—SHEET 8.

Inventor
DOMINIK M. BERNOTOW
By Cheever & Cox
Atty's

D. M. BERNOTOW.
MACHINE FOR LINING CARTONS.
APPLICATION FILED NOV. 28, 1919.

1,378,581.

Patented May 17, 1921.
10 SHEETS—SHEET 9.

Inventor
DOMINIK M. BERNOTOW
By Cheever & Cox
Attys

D. M. BERNOTOW.
MACHINE FOR LINING CARTONS.
APPLICATION FILED NOV. 28, 1919.

1,378,581.

Patented May 17, 1921.
10 SHEETS—SHEET 10.

Inventor
DOMINIK M. BERNOTOW.
By Cheever & Cox Atty's

UNITED STATES PATENT OFFICE.

DOMINIK M. BERNOTOW, OF CHICAGO, ILLINOIS, ASSIGNOR, BY MESNE ASSIGNMENTS, TO BUNTE BROTHERS, OF CHICAGO, ILLINOIS, A CORPORATION OF ILLINOIS.

MACHINE FOR LINING CARTONS.

1,378,581.  Specification of Letters Patent.  Patented May 17, 1921.

Application filed November 28, 1919. Serial No. 341,097.

*To all whom it may concern:*

Be it known that I, DOMINIK M. BERNOTOW, a citizen of the United States, residing at Chicago, in the county of Cook and State of Illinois, have invented a certain new and useful Improvement in Machines for Lining Cartons, of which the following is a specification.

My invention resides in a machine for inserting linings into cartons, paper and fiber boxes and the like, and the objects of the invention, in addition to the primary object of providing means for automatically lining a carton, are, First: To provide means for feeding forward the strip of paper or other material of which the linings are formed.

Second: To provide means for cutting the strips into lengths.

Third: To provide means for folding the cut off lining over a form or plunger.

Fourth: To provide means for infolding the forward end of the lining.

Fifth: To provide means for holding the carton squared while the folded lining is being inserted.

Sixth: To provide means for holding the end flap of the open end of the carton out of the way while the lining is being inserted.

Seventh: To provide means for advancing the folded lining into the carton.

Eighth: To provide means for bending back the end folds of the lining preparatory to their entering the carton.

Ninth: To provide means for ejecting the carton after the lining is inserted.

Tenth: To provide means for correlating the various elements into a single organized machine and to provide details of construction contributing toward that purpose.

I accomplish my objects by the mechanism illustrated in the accompanying drawings, in which—

Figure 1 is a general plan view of the machine.

Fig. 2 is a side elevation.

Fig. 3 is a side elevation of the principal operating parts, viewed from the side opposite to the one shown in Fig. 2.

Fig. 4 is a side elevation of the ratchet feed mechanism for advancing the paper strip.

Fig. 5 is an end view of the parts shown in Fig. 4.

Fig. 6 is a vertical sectional view on the line 6—6, Fig. 2.

Fig. 7 is a vertical sectional view on the line 7—7, Fig. 2. This view shows the paper feed mechanism and associated parts.

Fig. 8 is a transverse sectional view on the line 8—8, Fig. 2. This shows the means for shearing or cutting off the paper strip into suitable lengths to form the individual linings.

Fig. 9 is a transverse sectional view on the line 9—9, Fig. 2. This shows, among other things, the means for accomplishing what may be termed the "upfold" and the "crossfold."

Fig. 10 is a transverse section on the line 10—10, Fig. 2. This shows particularly the mechanism for producing the infold at the forward end of the lining.

Fig. 11 is a transverse section on the line 11—11, Fig. 2 and shows the mechanism for holding the carton squared while the lining is being inserted.

Fig. 11ª is a sectional detail of the means for squaring and gripping the carton while the lining is being inserted.

Figure 12:
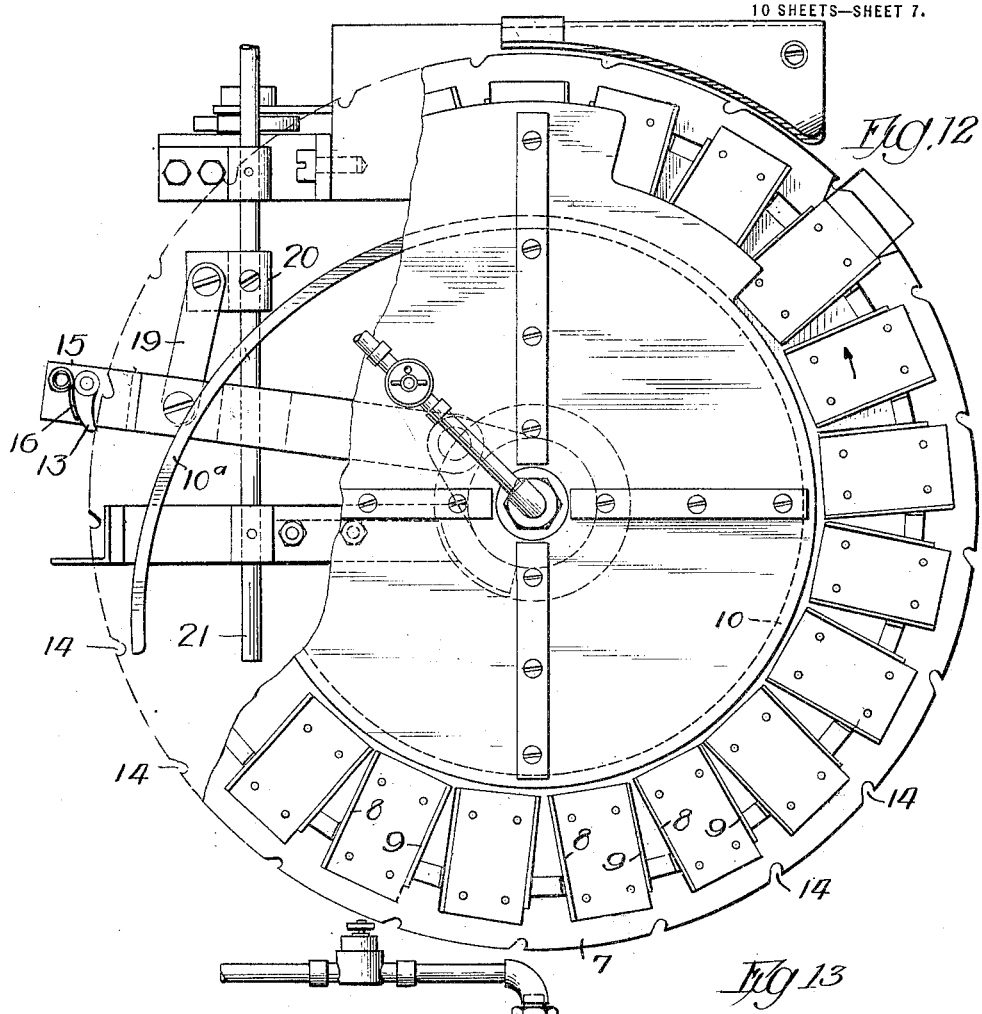

Fig. 12 is a plan view of the revolving carton holder or table, showing also the ejecting means, the step by step feed mechanism, and the means for holding the end flaps of the carton while the lining is being inserted.

Figure 13:
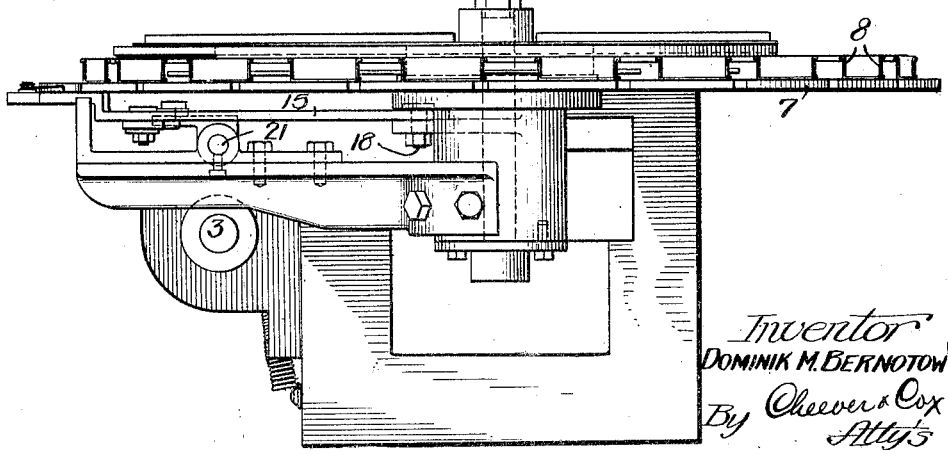

Fig. 13 is an elevation of the parts shown in Fig. 12.

Figure 14:
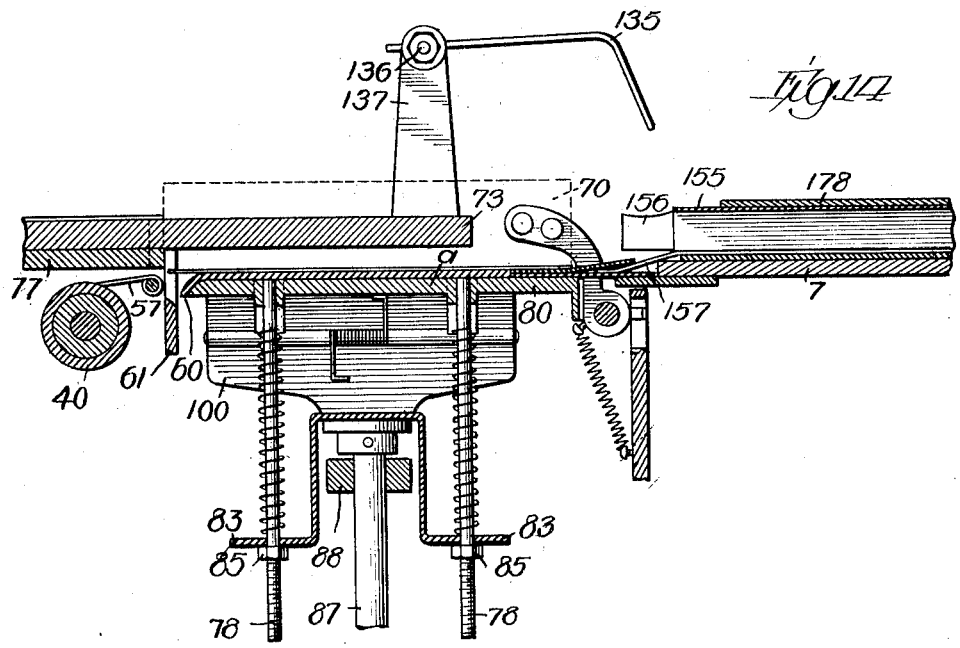

Fig. 14 is a sectional elevation taken on the line 14—14, Fig. 1.

Figs. 15 to 19, both inclusive, illustrate successive steps in the operation, and are partially diagrammatic in that they omit certain parts to make the operation easier to understand.

Figure 20:
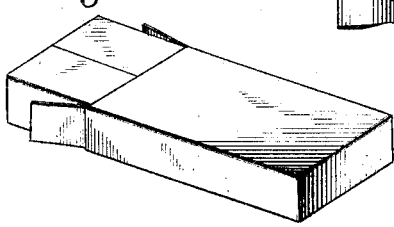

Fig. 20 shows the carton into which the lining has been inserted.

Like numerals denote like parts throughout the several views.

It will be understood that suitable linings may be made of different materials, and that they may be inserted into different types of cartons and boxes, but in the form selected to illustrate the invention I have shown the mechanism in a form adapted to introduce waxed paper into cartons such for example as are used for dispensing cough drops, hard candies, and the like.

In the form shown, the machine has a main frame 1 supported upon suitable legs or standards 2. A shaft 3 driven by a pulley 4 or other suitable power device is journaled in the frame and carries a number of operating cams which will be presently described. The cartons 6 with one end closed are supported upon a turn table 7 having clips or holders 8, 9 for holding the cartons radially with their open ends pointing outward. The cartons are usually introduced into the holders by hand, approximately at the point A, Fig. 1. The inner or rear ends of the cartons abut a curbing 10 which is concentric with the turn table except near the end 10ᵃ where it is eccentric as best shown in Figs. 1 and 12. The eccentric portion ejects the lined cartons from the turn table and permits them to drop off over an apron 11 into a waiting receptacle.

The turn table is given a step-by-step rotary movement by a pawl 13 adapted to enter notches 14 in the periphery of the turn table. The pawl is mounted upon an oscillating arm 15 and is backed up by a spring 16, as best shown in Fig. 12. This tends to keep the pawl in engagement with the turn table. Arm 15 is pivoted upon a stationary pin 18 and is oscillated by a link 19 pivoted at one end to the arm and at the other end to a block 20 which is adjustably secured to a slide rod 21. Said rod is reciprocated by a pitman 22 shown in the lower left portion of Fig. 1. This pitman is connected to the free end of a crank arm 23 fastened to the shaft 24. Said shaft is driven by a gear wheel 26 meshing with a gear wheel 27 fastened to a counter-shaft 28. Said counter-shaft is connected by bevel gearing 30 to the main shaft 3. Thus the rotation of the main shaft causes the reciprocation of the slide-rod 21 and this in turn causes the step-by-step rotation of the carton table.

The wax paper of which the linings are preferably made is stored in the form of a roll 35 carried by a spool 36 mounted upon a sleeve 37, as shown in detail in Figs. 6 and 7. This sleeve is carried upon a stationary arbor 38 suitably mounted in the main frame. From the roll the paper passes over a guide and feed roller 40 secured to a shaft 41 journaled in the main frame. This shaft is provided with a ratchet wheel 42 adapted to be engaged by a pawl 43. Said pawl is pivotally mounted at the free end of an oscillating arm 44. Said arm oscillates about shaft 41 as an axis and is oscillated by a spur gear wheel 46 engaged by a rack 47, as shown in Figs. 3 to 7. Rack 47 is fastened to a pitman 48, the opposite end whereof is pivoted to a crank arm 49 adapted to be rotated by counter-shaft 28 previously mentioned. The parts operate in such a manner that as shaft 28 rotates in synchronism with the main shaft the paper feed shaft 41 will receive an intermittent rotary motion so timed as to feed the paper forward the length of a lining blank every time a fresh blank is required.

In order to obtain the necessary tractive effect of the roller 40 upon the paper strip sticker wheels 51—51 are provided as best shown in Fig. 7. These are simply idlers and are pressed down upon the paper to hold it in contact with the feed roller. These wheels are mounted upon arbors 52 secured to a frame 53 which is vertically slidable in a stationary guide 54. The weight of the movable parts tends to keep the rollers down in contact with the paper.

Figure 15:
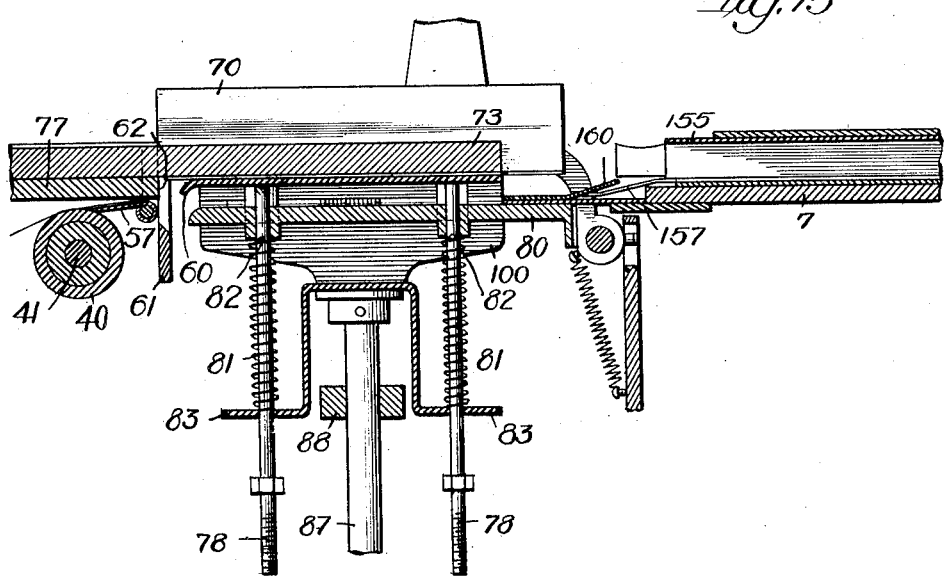

The paper passes from the roll 35 over a guide plate 57 best shown in Figs. 14 and 15. From the guide plate the paper passes on to an operating table 60 where the preliminary folding of the lining blank takes place. After the proper length of paper has passed onto this table it is severed from the rest of the strip by a vertically movable knife 61 which coöperates with a stationary cut-off 62. The parts are so arranged that the rise of the knife cuts off the proper length. This knife is operated by mechanism shown in detail in Fig. 8. The knife is pivoted at one end upon a stationary pivot 63 and at the other end has an anti-friction roller 64 in position to be actuated by a cam 65. This cam is secured to main shaft 3. The roller is kept in contact with the cam by means of a tension spring 66.

The severed length of paper, that is, the blank, which I have indicated by the reference numeral 70 is adapted to be folded about a form or plunger 73. This preferably consists of wood saturated in or coated with wax so as to be slippery and is of a cross sectional dimension similar to the internal dimensions of the carton but enough smaller so that the plunger with the paper around it may enter the carton. The plunger reciprocates radially toward and from the turn table in proper timed relation to the movements of the table, the motion of the plunger occurring, in the main, while the table is motionless. The plunger is reciprocated by a pitman 75 best shown in Figs. 1 to 3. One end of the pitman is pivoted to the rear end of the plunger and the other end is pivoted to a crank 76 fastened to countershaft 24. The pitman slides upon a plate 77 fastened to the stationary framework of the machine.

The operating table 60, previously mentioned, moves vertically toward and from the plunger in timed relation therewith. It is supported upon two upright rods 78 which are guided vertically by a depressed portion 80 of the plate 77 which is vertically apertured to accommodate them. These parts are best shown in Figs. 1, 9, and 14 to 19. The rods themselves are yieldingly supported upon compression springs 81 which surround the rod and at the upper end abut pins 82 fastened to said rod. The lower ends of the springs are supported upon flanges 83 forming a part of a vertically movable yoke 84. Said yoke is rigidly fastened to the upper end of a rod 87 which is arranged upright and is adapted to reciprocate in bearings 88 and 89 formed in a bracket 90 supported by the stationary frame work as best shown in Fig. 9. The means here shown for reciprocating the rod and yoke vertically include a lever 93 which is fulcrumed upon a stationary pin 94 and is jointedly connected at one end to rod 87 and at the other end is pivoted to a link 96. Said link at its opposite end carries an antifriction roller 97 adapted to be engaged by a cam 98 rigidly fastened to main shaft 3. The link is longitudinally slotted so as to straddle said shaft and thus be guided by it.

The lower ends of the rods 78 are threaded to take nuts 85. The parts are so proportioned and designed that when the yoke with its flanges 83 is in lowermost position, it will engage the nut and hold the operating table 60 down in contact with the plate 80. Thereafter when the yoke commences to rise, the operating table will rise with it until the pins 82 engage the underside of the plate 80, as shown in Fig. 15, whereupon the upward movement of the table will cease, although the yoke continues to rise. The operating table is arrested when the blank overlying it is brought into contact with the bottom of the forming plunger 73. The advantage in having a depressible operating table is to facilitate the positioning of the blank upon it preparatory to being brought into contact with the plunger.

Figure 16:
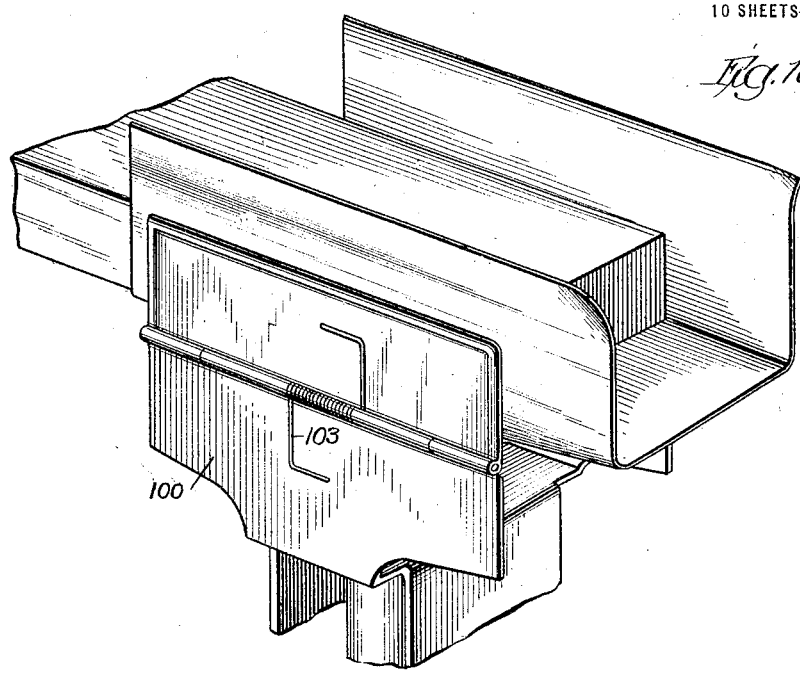
Figure 17:
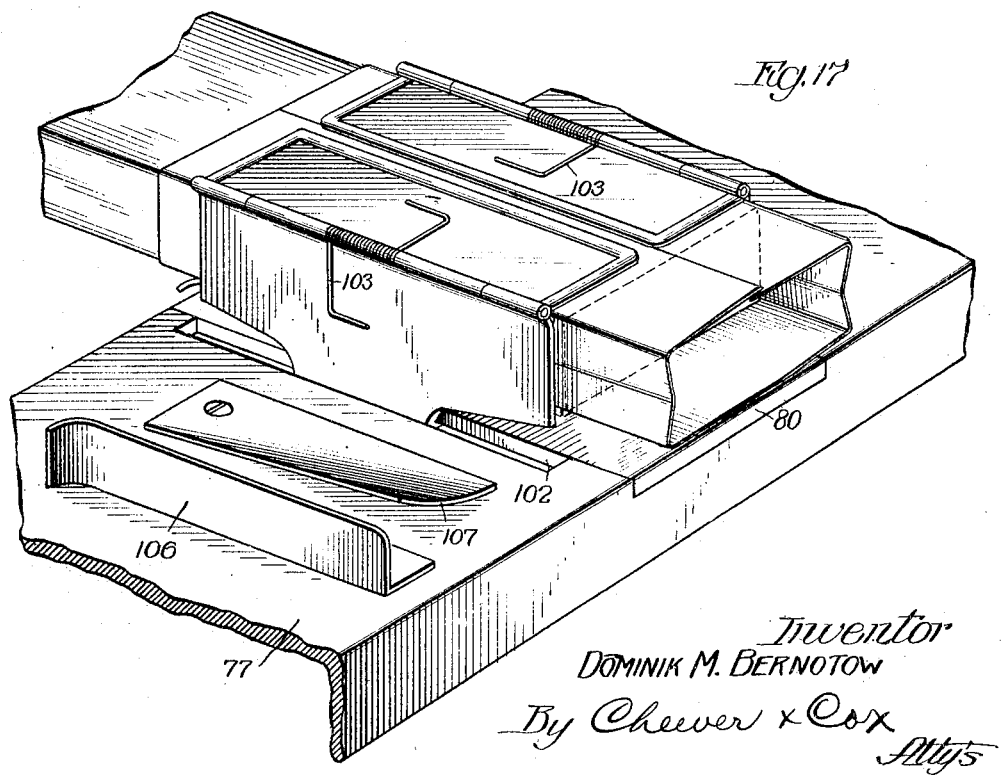

The yoke 84 carries important parts of the paper folding mechanism which will now be described. The yoke has two upstanding sides or plates 100 which are rigidly fastened to it and are spaced apart at a distance but slightly greater than the width of the forming plunger 73. The function of said yoke sides is to bend upward the sides of the blank and then hold them in contact with the sides of the plunger while the margins of the blank are being folded onto the top of the plunger. Pivoted to the upper edges of the yoke sides 100 are two foldable wings 101 which, when the yoke rises, pass up through slots 102 in the plate 77. These slots are best shown in Figs. 9 and 17. Springs 103 engage the wings on the yoke sides in such manner as to constantly urge the wings inward. The result is that when the yoke sides have risen so that their upper edges are level with the top surface of the plunger, the wings will automatically fold inward and fold the margins of the blank inward so as to overlie the plunger. The progressive movements are illustrated in Figs. 16 and 17. The piece of paper as it arrives onto the plate 77 is guided by gage blocks 106 and the front corners are uptilted slightly by cams 107, see Figs. 9 and 17.

After the sides of the paper have been folded around the forming plunger, the forward end is folded around the front end of the plunger by mechanism which will now be described: The sides of the now tubular paper blank are infolded by fingers 110, the inner ends of which are rounded as shown in Fig. 10 and elsewhere. These fingers may be regarded as tucking fingers or breakers and they are fastened to arms 111 extending upward from sleeves 112 slidingly mounted upon a stationary guide bar 113. Said sleeves are reciprocated in unison toward and from each other by slotted levers 115, the lower ends whereof are fulcrumed upon stationary pivots 116. One of said levers is connected by a link 118 to a collar 119 which is adjustably secured by set screw 120 to a slide rod 121. Said rod is arranged horizontally and is slidably mounted in the stationary frame work. At one end it is provided with an antifriction roller 125 adapted to coöperate with the cam 126 rigidly fastened to the main shaft 3. A spring 122 encircles rod 121 and has one end abutting the main frame and the other a collar 123 secured to said rod by a set screw 124 or other appropriate means. The function of the spring is to keep the roller 125 in contact with cam 126 during the active operation of the latter. The rotation of the shaft and cam causes the rod to slide horizontally back and forth and causes the oscillation of one of the levers 115. The two levers 115 are caused to move in unison in opposite directions by intermeshing segmental gears 130 which are rigidly fastened to the respective levers.

After the sides of the tubular paper strip are thus infolded, their forward ends are backfolded by a bail 135, the mountings whereof are best shown in Figs. 2, 3, 10, and 14. Referring especially to Fig. 10, it will be seen that said yoke is fastened to a horizontal rock shaft 136 journaled in standards 137. This shaft is rocked by a link 140 connected to the upper end of a push rod 141. Said rod is guided by a stationary bracket 143 and at the lower end bears upon the free end of an oscillating lever 144. A spring 145 keeps the pitman down in contact with said lever. Said lever is fulcrumed upon a stationary pin 148 carried by a bracket 149 and between its ends has an anti-friction roller 150 adapted to coöperate with a cam 151 fastened to the main shaft 3. According to the present design, the bail 135 is capable not only of turning up the ends of the paper lining strip to facilitate entrance into the open end of the carton 6 but it is also capable of holding the side flaps 156 of the carton spread outward as shown, for example, in Fig. 18.

The crossflap 157 of the carton is held down at this time by a cam 160 which in the main lies approximately horizontal as shown in Figs. 14 and 15 and permits said flap to be brought under it by the rotating turn table 7.

While the lining is being inserted into the carton, the latter is gripped in the clips or holders by mechanism best shown in Figs. 11 and 11ª. The side 8 is stationary while the side 9 is pivoted at the bottom to enable it to swing toward and from the side of the carton. The swinging side 9 is operated by an arm 165 having a button 166 in position to be engaged by the vertically movable push rod 167. This rod is mounted beneath the turn table and the latter has a set of apertures 170 through which the push rod may rise to engage the button. Said rod is guided by any suitable means, for example, a bracket 171 and is actuated by a lever 172 fulcrumed upon a stationary pin 173 and provided at one end with an anti-friction roller 174 adapted to be engaged by a cam 175 fastened to the main operating shaft 3. A spring 176 is so mounted as to hold the roller in contact with the cam. When the carton arrives at the operating station where the lining is to be inserted, the button 166 and aperture 170 appertaining to the clip in which the carton is held come in vertical alinement with the push rod 167 whereupon said rod rises, engages the button, pushes it up, and thus swings the side 9 into close contact with the side of the carton. This not only squares the carton, but grips it sufficiently to prevent it from following the forming plunger when the latter is retracted after having inserted the lining. After the lining has been inserted and the plunger has been withdrawn, the rod 167 descends, permitting the arm 165 to drop down onto the table and permit the side 9 to fall away slightly and release its grip on the carton.

While the lining is being inserted in the carton, the latter is held down, seated in its clip or holder by a shoe or plate 178 which lies parallel to the table a short distance above it. The shoe is at such elevation as to touch or practically touch the top of the carton at the inserting station and in order that the carton may be properly seated by the time it arrives at the inserting station, it is desirable to provide the shoe with a cam or pilot piece 179 which at the forward end is elevated but gradually descends to the level of the rest of the shoe. The portion of the shoe which overlies the cartons does not extend over the whole circumference of the table, but only over a portion thereof, for example, about one-quarter, commencing somewhat in front of the inserting station and ending in front of the charging station A.

Figure 18:
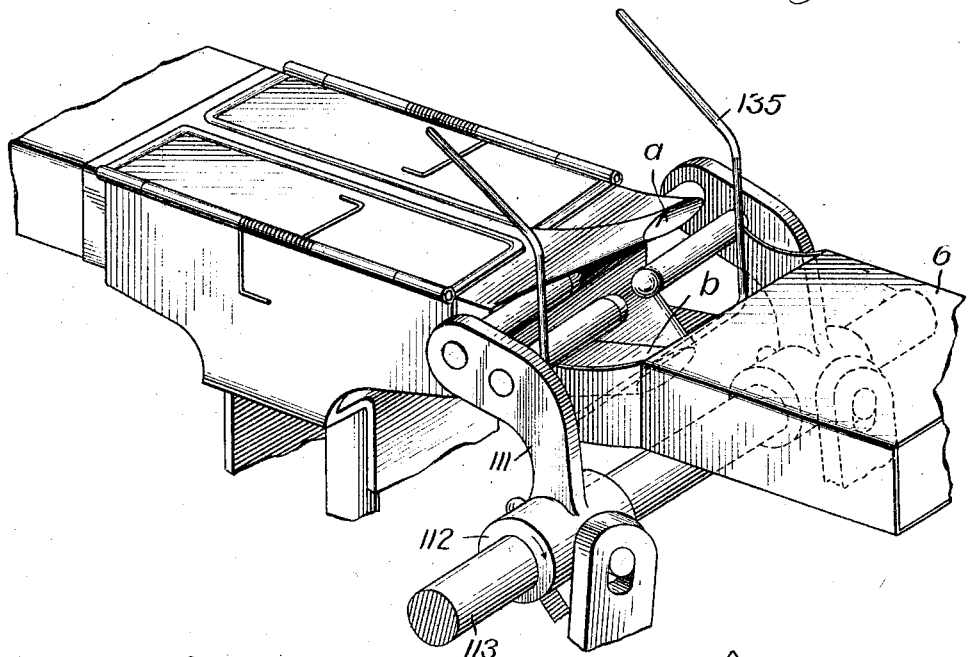
Figure 19:
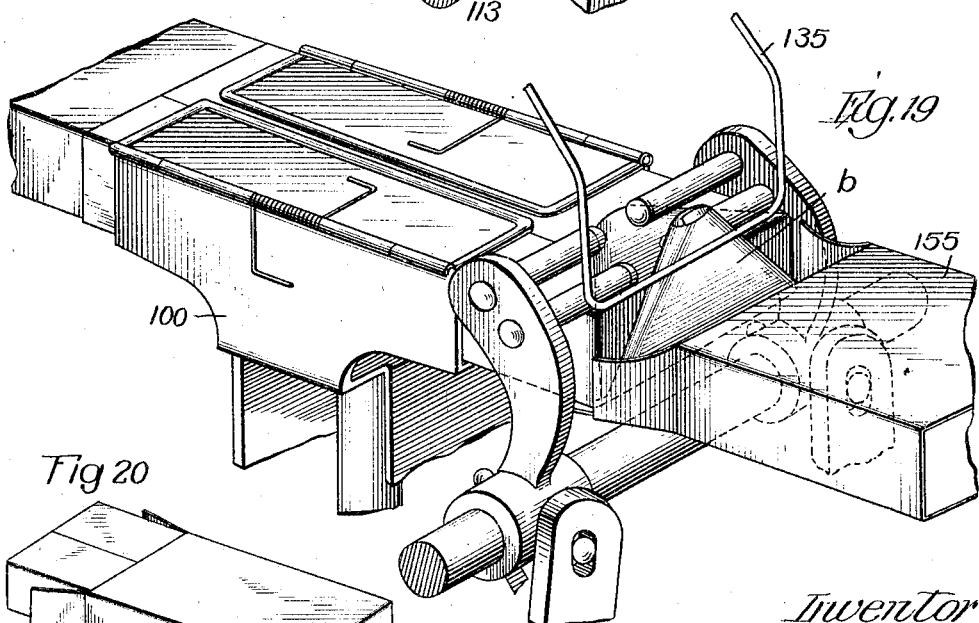

In practice, the operator stands or sits aproximately at the station marked A in Fig. 1 and feeds the cartons into the holders of the turn table. The table rotates step by step until the carton reaches the cam portion 179 of the shoes 178 whereupon the shoe overrides the carton and insures the proper seating thereof. About the same time, the cross flap 157 of the carton is engaged by the lower shoe or cam 160 and is held down by it. Finally the carton arrives at the operating or inserting station, in line with the forming plunger 73. The bail 135 now descends and holds the side flaps 156 of the carton spread, out of the way of the lining which is presently to enter. At this time the plunger is retracted and, at the beginning of the cycle of operation, the operating table 60 is down in contact with the stationary plate 80 as shown in Fig. 14. The feed roller 40 now feeds a length of the paper strip over onto the depressed operating table after which the knife 61 rises, cuts off the proper length, and then descends. The plunger now advances until its forward end is over the forward end of the operating table in the position shown in Fig. 15. Next, the yoke 84 starts to rise, permitting the operating table 60 to rise with it and hold the lining in contact with the bottom of the plunger. The yoke continues its rising movements and as the upper edges of the side wings 101 pass up through the slots 102 and engage the sides of the lining, they fold the latter up into contact with the sides of the plunger, as shown in Fig. 16. The yoke still continues to rise until the hinges of the wings 102 come flush with the top of the plunger whereupon the springs 103 swing the wings inward and cause them to hold the lining over onto the top of the plunger as shown in Fig. 17. The lining may now be considered as being in tubular form. Next, the fingers 110 move inward and crush or break ths projecting ends of the lining, forming two flaps *a* and *b* above and below, as shown in Fig. 18. The bail 135 now rises and the fingers 110 withdraw, thereby causing and permitting the flaps to be folded back over the top of the plunger, which now begins to advance to insert the lining into the carton. The plunger continues its forward movement until the lining has been completely inserted, whereupon it reverses its direction of motion and withdraws to initial position, leaving the lining in place. The lining does not follow the retreating plunger because the latter is made slippery by means of wax or other lubricant and the friction is less than the friction of the outer surface of the lining with the inner surface of the carton. The carton itself is prevented from following the retreating plunger by the gripping mechanism shown in Figs. 11 and 11ª. After the lining has thus been inserted and the plunger withdrawn, the table rotates one step, thus presenting a fresh carton and bringing the just lined carton closer to the eccentric curb 10ª (see Figs. 1 and 12). Subsequent movements of the table finally cause the lined carton to be ejected under the action of the curbing 10ª, the ejected cartons presenting the appearance shown in Fig. 20.

Having thus described my invention what I claim as new and desire to secure by Letters Patent, is:

1. A machine for lining cartons having a turn table adapted to support the cartons, said table being rotatable to bring the cartons to the operating point of the machine, means located at the operating point for inserting the lining, and a stationary shoe at the operating point adapted to override the cross flap of the carton as the latter approaches the operating point for holding said flap out of the way of the entering lining.

2. A machine for lining cartons having a turn table adapted to support the cartons, said table being rotatable to bring the cartons to the operating point of the machine, means located at the operating point for inserting the lining, and a stationary shoe at the operating point adapted to override the cartons as they approach the operating point for holding the cartons seated on the turn table while the lining is being inserted.

3. In a machine for lining cartons, means for holding the cartons at the operating point of the machine, inserting means at the operating point of the machine for inserting a lining into the carton, the cartion having end flaps, and means operating in timed relation with the inserting means for holding the end flaps spread while the lining approaches.

4. In a machine for lining cartons, means for holding the cartons at the operating point of the machine, inserting means at the operating point of the machine for inserting a lining into the carton, the carton having end flaps, a bail located at the operating point and adapted to enter between the end flaps of the carton for holding them spread while the lining approaches, and means operating in timed relation with the inserting means for withdrawing the bail prior to the arrival of the inserting means.

5. In a machine for lining cartons, a form around which the lining blank is to be wrapped preparatory to insertion in the carton, and means for wrapping the blank around said form, said means including an operating table adapted to receive the flat blank, means for moving said table toward and from the form for holding the blank in contact with it during the wrapping operation, wings adapted to pass alongside the form for bringing the blank against the sides of the form, and means for subsequently bringing the margins of the blank onto the remaining surface of the form to thereby render the blank tubular.

6. In a machine for lining cartons, a form around which the lining blank is to be wrapped preparatory to insertion in the carton, and means for wrapping the blank around said form, said means including an operating table adapted to receive the flat blank, means for moving said table toward and from the form for holding the blank in contact with it during the wrapping operation, wings adapted to pass alongside the form for bringing the blank against the sides of the form, secondary wings pivoted to the edges of the first mentioned wings, and means for urging said pivoted wings inward to bring the marginal edges of the blank into contact with the remaining surface of the form.

7. In a machine of the class described, the combination of a form having a rectangular cross section, a blank holder for holding the blank in contact with one surface of the form, means movable independently of the blank holder for causing the blank to bend into contact with two opposite remaining surfaces of the form, and wings pivoted to the last mentioned means, said wings being biased inward whereby after they have passed beyond the plane of the remaining uncovered surface of the form they will fold the margins of the blank into contact with said uncovered surface to thereby render the blank tubular.

8. In a machine of the class described, the combination of a form having a rectangular cross section, a blank holder for holding the blank in contact with one surface of the form, a yoke movable independently of the blank holder, said yoke being retractable from the form to admit a fresh lining blank thereto, and said yoke having sides adapted to pass to the opposite sides of the form for bringing the blank into contact therewith, and wings pivoted to the yoke sides and biased inward for infolding the remaining portions of the blank, the blank holder being adapted to hold the wings spread when the yoke is in retracted position.

9. In a machine of the class described, the combination of a form having a rectangular cross section, an operating table adapted to support a blank, said table being vertically movable toward and from the bottom of the form, means for feeding a blank onto the table when the latter is depressed, a vertically movable yoke for yieldingly supporting the table, said yoke being adapted to depress the table, the yoke being adapted to straddle the operating table and form, and having inwardly biased wings adapted to be held apart by the table when the yoke is depressed.

10. In a machine for lining cartons, means for holding a carton, a reciprocating forming plunger movable toward and from the carton for inserting the lining, an operating table, means for delivering a lining blank onto said table, said table being movable toward and from the plunger for holding the blank in contact with the plunger, and means for folding the blank around the plunger simultaneously from two opposite sides while the table is holding it in contact with the plunger.

11. In a machine of the class described, means for bending a paper blank into tubular form, said means including two plates arranged parallel to and facing each other, said plates being jointed whereby one part of each plate is able to swing inward toward the other part, means for urging the swingable part of each plate inward, a rectangular prism constituting a former, and means for producing relative movement between the plates and the prism transversely to the length of the latter and to bring the joints of the plates flush with one surface of the prism, the prism itself being adapted to prevent the inward movement of the swingable parts prior to the arrival of their joints flush with the surface of the prism.

12. A structure as specified in claim 11 in which the blank is supported by a depressible operating table and means are provided for raising the table to bring the blank into contact with the bottom of the prism to hold it there while the rest of the folding operation is performed.

13. In a machine for lining cartons, means for holding the carton to be lined, a forming plunger, rectangular in cross section, means for holding the paper blank in contact with one surface of the plunger, and plates movable transversely to the length of the plunger and adapted to pass to the two sides of the plunger for bending the blank into contact therewith, said plates being jointed and each having a movable part biased to swing inward to fold the blank onto the remaining surface of the plunger when the joints have become flush with it.

14. In a machine for lining cartons, the combination of means for holding the carton, a plunger adapted to reciprocate into and out of the carton, means for folding the lining blanks around the bottom, sides, and top of the plunger, and tucking fingers adapted to be moved in simultaneously from opposite sides at a point beyond the end of the plunger for tucking in the sides of the projecting portion of the lining, prior to the insertion of the lining into the carton.

15. In a machine of the class described, in combination, a former in the shape of a rectangular prism, means for folding a paper blank around the bottom, sides, and top of the former, tucking fingers approachable simultaneously from opposite the sides at a point beyond the end of the former for tucking in the sides of the projecting portion of the blank, thereby forming a top and a bottom flap in the blank, means for folding said flap back against the former, and means for subsequently withdrawing the former from the folded blank.

16. A machine for lining cartons having means for holding the cartons, a plunger adapted to reciprocate into and out of the carton, means for wrapping a lining blank around the bottom, sides and top of the plunger with the forward end of the blank projecting beyond the forward end of the plunger, and means for folding the projecting ends of the blank back upon the plunger.

17. A machine for lining cartons having means for holding the cartons, a plunger adapted to reciprocate into and out of the carton, means for wrapping a lining blank around the bottom, sides, and top of the plunger with the forward end of the blank projecting beyond the forward end of the plunger, tucking fingers adapted to move in from the sides for tucking the sides of the projecting ends of the blank, thereby forming a top and bottom flap, and means for folding said flaps back upon the plunger.

18. A machine for lining cartons having means for holding the cartons, a plunger adapted to reciprocate into and out of the carton, means for wrapping a lining blank around the bottom, sides, and top of the plunger with the forward end of the blank projecting beyond the forward end of the plunger, tucking fingers adapted to move in from the sides for tucking the sides of the projecting ends of the blank, thereby forming a top and bottom flap, a bail adapted to underlie the flaps during the operation of the tucking fingers, and means for subsequently lifting the bail to thereby hold the flaps back upon the plunger.

19. A machine for lining cartons, having means for holding the cartons, a plunger, means for wrapping a paper blank around the plunger with the ends projecting beyond the end of it, tucking fingers for tucking in the sides of the projecting portion of the blanks, means movable transversely of the path of the plunger for folding the projecting portions of the lining back upon the plunger, and means for advancing the plunger into the carton and subsequently withdrawing it.

20. A machine for lining cartons, having means for holding the cartons, a plunger, means for wrapping a paper blank around the plunger with the ends projecting beyond the end of it, tucking fingers for tucking in the sides of the projecting portion of the blanks, means movable transversely of the path of the plunger for folding the projecting portions of the lining back upon the plunger, means for advancing the plunger into the carton and subsequently withdrawing it, and means for gripping the carton during the insertion and withdrawal of the plunger for preventing it from following the retreating plunger.

In witness whereof I have hereunto subscribed my name.

DOMINIK M. BERNOTOW.